United States Patent [19]
Muellenberg

[11] Patent Number: 5,370,472
[45] Date of Patent: Dec. 6, 1994

[54] CONE-TYPE CLAMPING ARRANGEMENT

[76] Inventor: Ralph Muellenberg, Im Wiesengrund 6, D-4048 Grevenbroich 12, Germany

[21] Appl. No.: 939,518

[22] Filed: Sep. 8, 1992

[30] Foreign Application Priority Data

Sep. 5, 1991 [DE] Germany .............................. 4129490

[51] Int. Cl.$^5$ .............................................. F16D 1/09
[52] U.S. Cl. ...................................... 403/370; 403/16; 403/374
[58] Field of Search ............... 403/370, 371, 368, 374, 403/16, 409.1

[56] References Cited

U.S. PATENT DOCUMENTS

| | | | |
|---|---|---|---|
| 687,864 | 12/1901 | Smyth | 403/370 X |
| 1,393,064 | 10/1921 | Woodward . | |
| 2,556,151 | 6/1951 | Bremer | 403/370 X |
| 2,718,155 | 9/1955 | Firth | 403/370 X |
| 2,842,233 | 7/1968 | Greenleaf | 403/370 |
| 3,717,367 | 2/1973 | Peter et al. | 403/370 X |
| 3,847,493 | 11/1974 | Peter et al. | 403/371 X |
| 3,847,495 | 11/1974 | Peter et al. | 403/370 |
| 3,958,888 | 5/1976 | Mullenberg . | |
| 4,095,908 | 6/1978 | Schäfer et al. | 403/370 X |
| 4,235,573 | 11/1980 | Peter et al. | 403/370 X |
| 4,702,635 | 10/1987 | Muellenberg | 403/368 X |

FOREIGN PATENT DOCUMENTS

| | | |
|---|---|---|
| 0318977 | 6/1989 | European Pat. Off. . |
| 850824 | 9/1939 | France . |
| 2289785 | 5/1976 | France . |
| 2159813 | 10/1973 | Germany . |
| 7433172 | 2/1975 | Germany . |
| 2414451 | 4/1975 | Germany . |
| 2535825 | 10/1976 | Germany . |
| 2652157 | 8/1978 | Germany . |
| 3145521 | 5/1983 | Germany . |
| 3418993 | 11/1985 | Germany . |
| 3938445 | 4/1991 | Germany . |
| 653287 | 12/1985 | Switzerland . |
| 1417107 | 12/1975 | United Kingdom . |

Primary Examiner—Randolph A. Reese
Assistant Examiner—George D. Spisich
Attorney, Agent, or Firm—Foley & Lardner

[57] ABSTRACT

The cone-type clamping arrangement is arranged in the intermediate space between the external circumference of a shaft and the internal circumference of the bore of an external member. It comprises a double-cone member, a cone ring arranged on the first cone surface of the double-cone member, and, arranged on the second cone surface of the double-cone member, a cone member which has an axial extension with cylindrical internal circumferential surface, which extension overlaps the cylindrical external circumferential surface of the cone ring and forms an overlap. During clamping, friction only occurs on three surface pairs. During loosening, the cone ring is supported, with a radial circumferential projection, on the flank of a circumferential groove of the double-cone member.

10 Claims, 4 Drawing Sheets

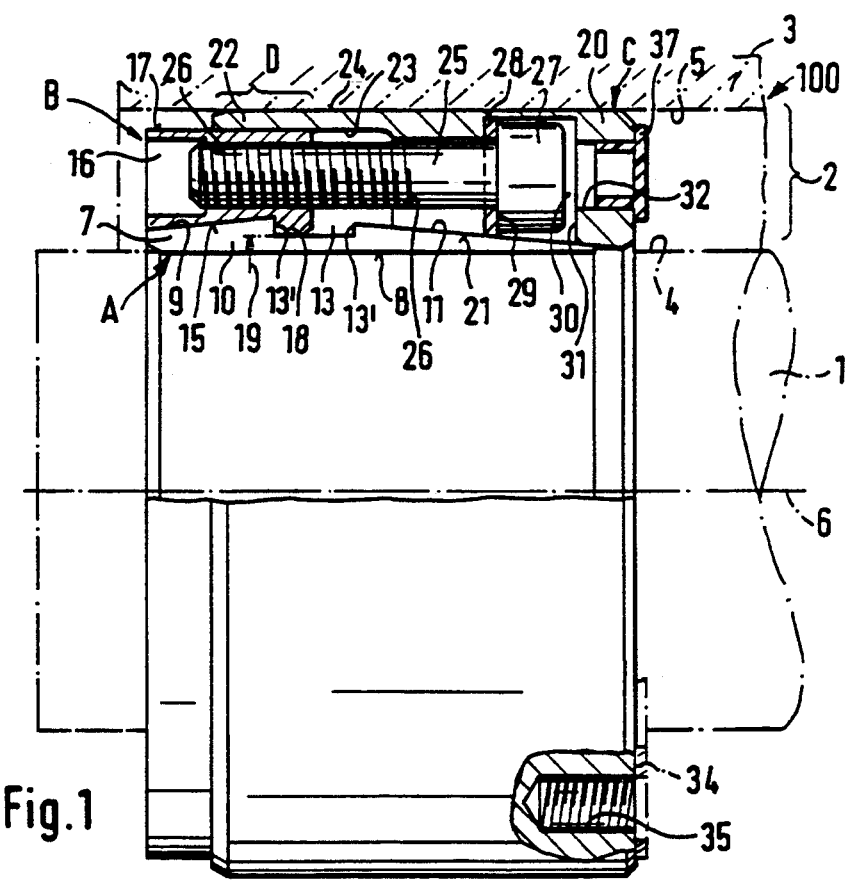

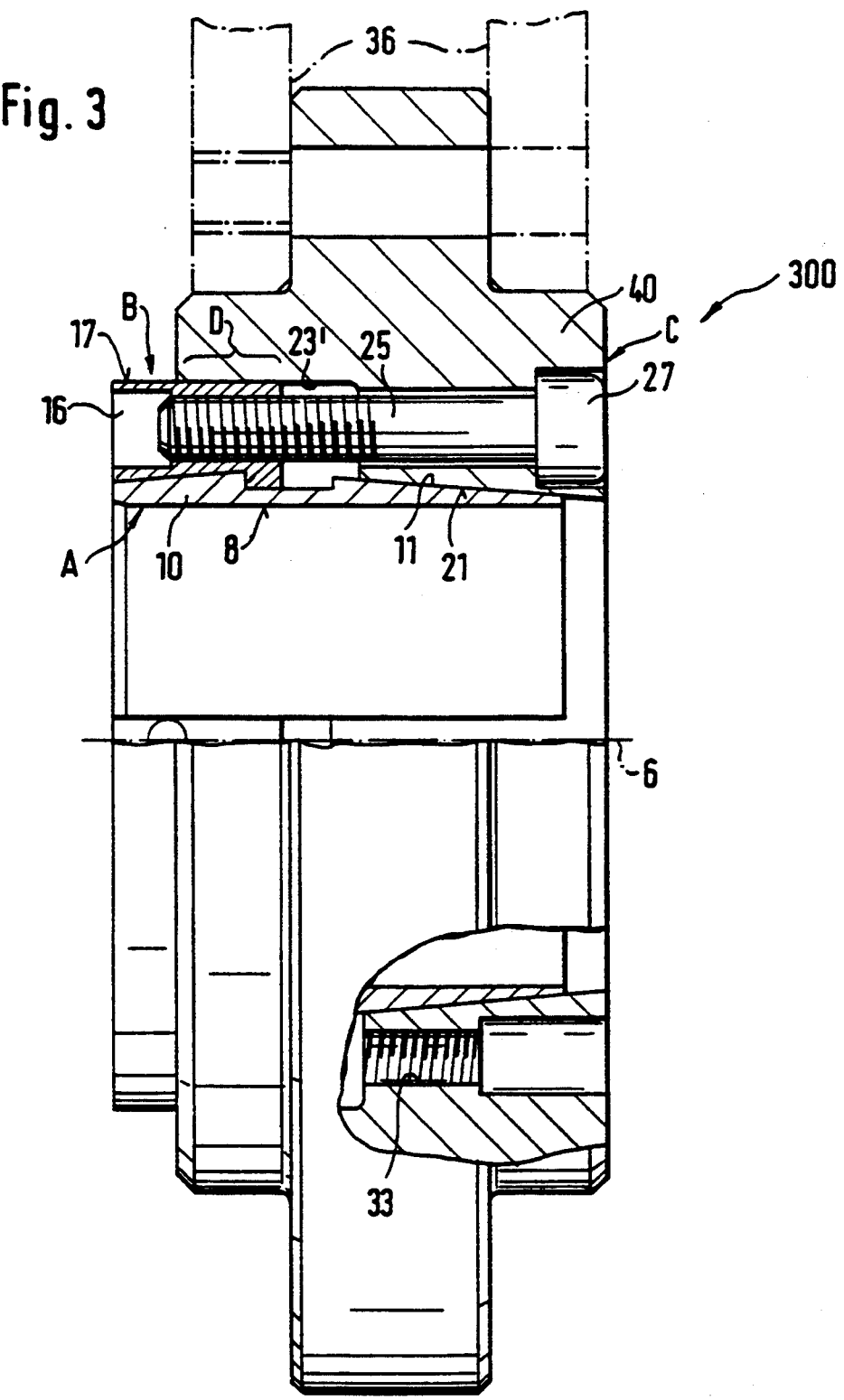

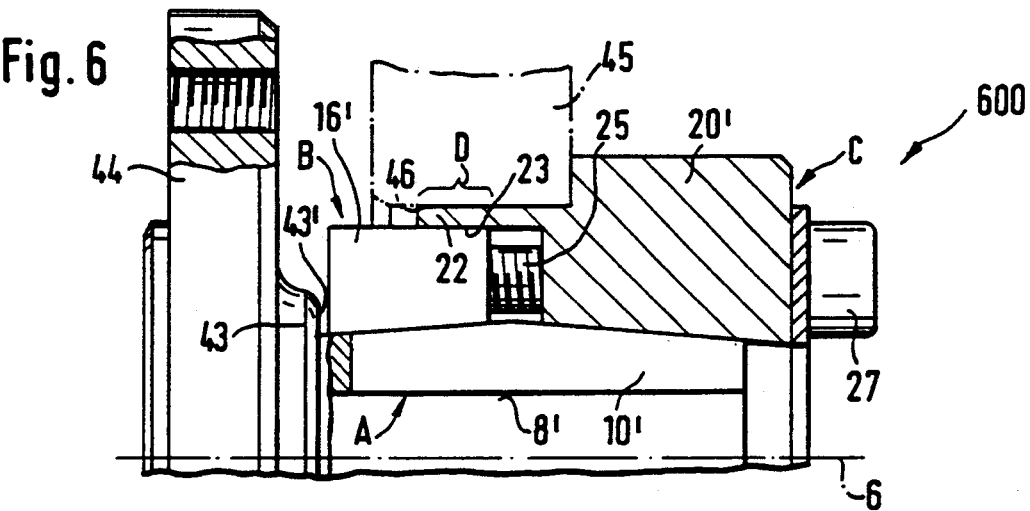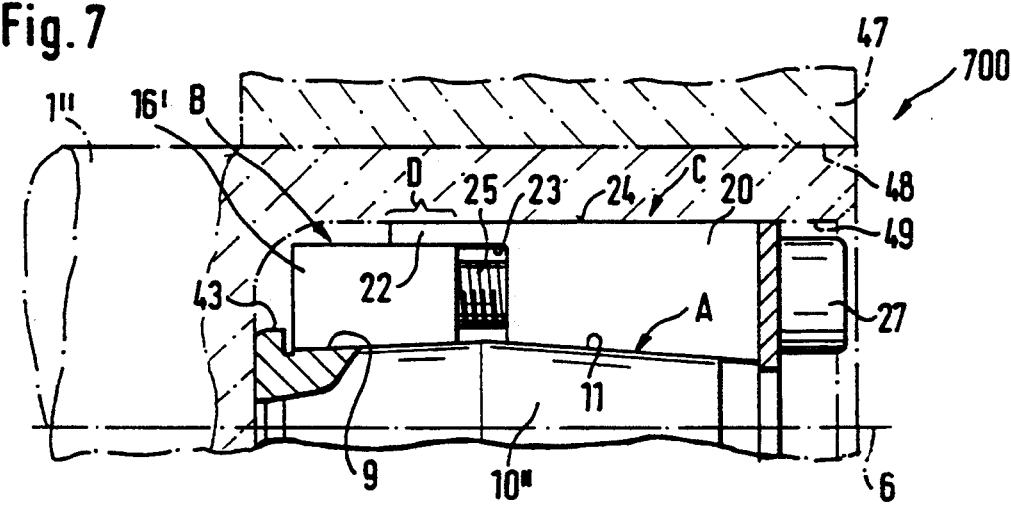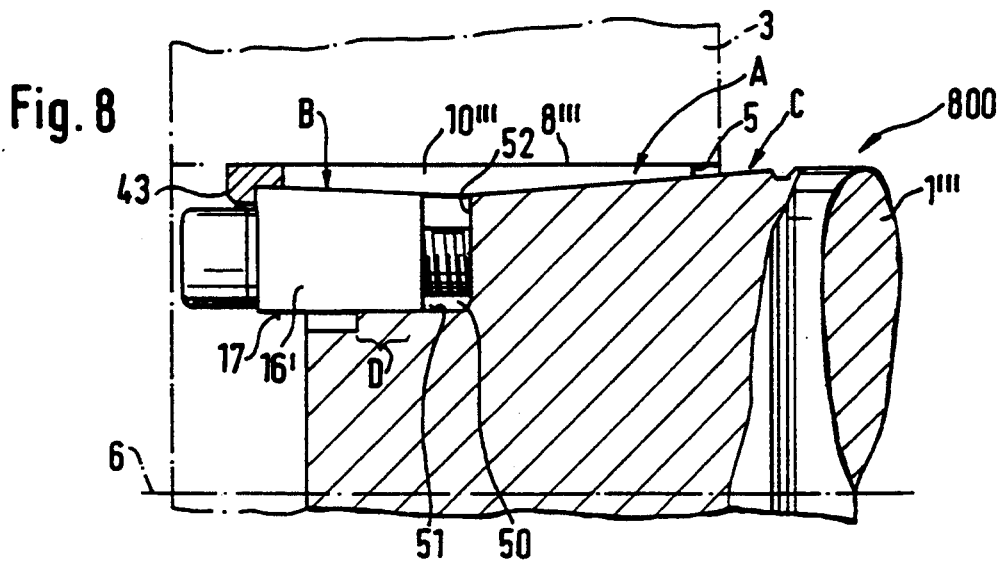

CONE-TYPE CLAMPING ARRANGEMENT

BACKGROUND OF THE INVENTION

1. Field of the Invention

The invention relates to a cone-type clamping arrangement, in which two elements with a conical internal circumferential surface, which are arranged one behind another in the axial direction, are pulled up onto a double-cone surface by means of axial clamping screws and radial clamping is brought about.

2. Discussion of the Related Art

A clamping arrangement, designed as a separate clamping assembly, for clamping a hub on a shaft is known from DE-OS 21 59 813, in which there is arranged on the shaft in the intermediate space between hub and shaft a thin-walled double-cone ring. The greatest outside diameters of the individual cone surfaces are adjacent to one another in the center, and, in this central region, the clamping arrangement has a circumferential groove of rectangular cross-section. Arranged on the two cone surfaces are external cone rings which, with their cylindrical external circumferential surfaces, bear against the internal circumferential surface of the hub. The external cone rings have collars at mutually facing ends, which project radially inward from their cone surfaces and engage in a hook-like manner in the circumferential groove. The clamping screws extend axially between the external cone rings.

During tightening of this clamping assembly, the external cone rings are subjected to friction in each case on their external and internal circumferential surfaces, that is to say, friction occurs overall on four surfaces. As a result of this, a considerable proportion of the useful axial clamping force of the clamping screws for conversion into radial clamping force is lost.

SUMMARY OF THE INVENTION

The aim of the invention is to avoid such losses.

According to a first aspect of the invention, a double-cone member has a first and a second axially adjacent circumferential surface designed as self-locking cone surfaces which are arranged in such a manner that the greatest wall thickness of the double-cone member, seen axially, is situated in its center. A cone ring has a cylindrical circumferential surface and, opposite this, a conical circumferential surface with a cone angle which is the same as the first cone surface of the double-cone member, and bears against the latter surface. A cone member with a conical circumferential surface has a cone angle which is the same as the second cone surface of the double-cone member and bears against the latter surface. Provided on the cone member is an overlap with a cylindrical circumferential surface which overlaps the cylindrical circumferential surface of the cone ring and bears against the latter surface. Distributed over the circumference are axial clamping screws which are designed as cap screws and which extend through the cone ring or the cone member and bear against the latter with a head and engage with a thread in the other element in each case. Pressing-off means provide for the axial removal of the cone ring and of the cone member from one another. On the double-cone member, a flank opposes the cone ring being pushed off from the first cone surface of the double-cone member and projects radially in the region of a plane perpendicular to the axis.

As a result, it is brought about that, during tightening of such a cone-type clamping arrangement, friction only occurs on the two cone-surface pairs and on the cylindrical circumferential surface of the external cone ring which surface bears against the overlap of the cone member. Moreover, no axial displacement of elements occurs during tightening. This is achieved, however, by the hub being displaced in the axial direction in relation to the shaft during tightening. This displacement can, however, be accepted in many cases and then declines in its significance in relation to the gain in radial clamping force. The "flank" allows a safe loosening of the three elements of the cone-type clamping arrangement from one another. On actuating the pressure means, the cone member with the "overlap" can be removed from the cylindrical circumferential surface of the cone ring, whereupon all parts are separated.

The overlapping of a cone ring by an axially adjacent cone member, namely by a thin-walled axial extension of an axially adjacent cone ring, is known per se from DE-AS 26 52 157. In this case, however, it is not a clamping assembly or a clamping arrangement, in which radial clamping forces are transmitted through the thin-walled extension. In the known embodiment, the thin-walled extension rather has only a protective function, preventing the penetration of impurities into the axial intermediate space between the two cone rings.

One feature of the invention has been found to be important in practice, wherein a flank is formed in one piece on a double-cone member and a cone ring is continuously divided in planes running through the axis, in at least two places which are uniformly distributed over the circumference. The cone ring consists in this case of two halves which can be brought during mounting behind the flank without elastic radial deformation. In the embodiment according to DE-OS 21 59 8713, such a deformation is necessary, and, as a results, the engagement depth of the inwardly projecting collars is limited. At the same time, this means a limitation of the pressing-off forces which are possibly no longer sufficient for loosening in the case of tight-fitting cone-type clamping arrangements.

In general, it is sufficient if the cone ring is divided in two places staggered in the circumferential direction by 180° and consequently consists of two halves.

In an embodiment of the cone-type clamping arrangement. the double-cone member or the cone member are designed as double-cone ring or cone ring with cylindrical circumferential surfaces lying opposite the cone surfaces. This produces a cone-type clamping assembly with cylindrical internal and external circumferential surface, which can be inserted into the intermediate space between a shaft and a hub bore. The advantage lies in the fact that the external circumferential surface of the shaft and the internal circumferential surface of the hub bore require no high grade machining nor in particular the application of cone surfaces, which requires considerable outlay in larger members if the necessary precision is to be guaranteed.

The "overlap" that is to say the cylinder surface of the cone member covering the cylindrical circumferential surface of the cone ring, can, in a cone-type clamping arrangement designed as a clamping assembly, be designed so that the overlap on the cone member is formed by a thin-walled axial extension with a second cylindrical circumferential surface which is coaxial with the cylindrical circumferential surface and passes over into the cylindrical circumferential surface the cone ring forming the cone member. Although the design is known generally from DE-AS 26 52 157, here it has a new function: the displacement of the cone ring is kept at a distance from the adjacent member by the overlap.

Although not necessary, in the preferred embodiment the invention, the double-cone member is the internal member and the cone ring and the cone member are located thereon on the outside.

For the design of the flank and of the corresponding contact region, two particular embodiments are possible. In one embodiment, the flank projects radially in the region of a plane perpendicular to the axis and is formed by a flank of a circumferential groove provided axially between the cone surfaces of the double-cone member and the cone ring. It has at its thin-walled end a circumferential projection which projects perpendicularly to the axis and engages in the circumferential groove. In a second embodiment, the projects radially in the region of a plane perpendicular to the axis and is formed by a circumferential projection of the double-cone member, which projection is provided at the external end of the first cone surface of the double-cone member and projects radially in front of the axially external end side of the cone ring in the region of the plane perpendicular to the axis.

Pressing-off screws, known generally from DE-OS 21 59 813, are possible as pressing-off means. The pressing-off means can formed by axial pressing-off screws distributed uniformly between clamping screws in a circumferential direction. The pressing-off screws engage in threaded bores of the cone ring or the cone member and are supported against bore-free places on the axially internal end side of the other element in each case.

In an alternative embodiment of the pressing-off means, the cone member has recesses for receiving the head of the clamping screws, which, at a spacing which slightly exceeds a height of the head, have flanks perpendicular to the axis as contact surfaces for the underside or upper side of the head. The cone member has through-bores which are radially outwardly open for the radial introduction of the clamping screws. In this case, the clamping screws themselves act as pressing-off means, acting with the outside of their head against one flank of the recesses, in which the head is accommodated (DE-PS 39 38 445).

In the cone-type clamping arrangement according to the invention, it is true that the loosening of the clamping assembly is guaranteed in any case. According to the arrangement in detail, however, it may be that the cone ring is not loosened first upon actuation of the pressing-off means and that it is accordingly necessary to pull down the entire "overlap" of the cone member from the cone ring. In order to avoid the great displacement distances associated therewith, it may be advisable to dimension the circumferential surfaces bearing against a counter-surface according to angle and extent so that, on actuation of the pressing-off means, the cone ring is loosened first and comes to bear against the flank of the double-cone member. This is intended to ensure that the cone ring is always loosened first on actuation of the pressing-off means.

BRIEF DESCRIPTION OF THE DRAWINGS

Exemplary embodiments of the invention are illustrated in the drawing.

FIG. 1 is a side view partially in section and taken along a plane running through the axis of a first embodiment of the cone-type clamping arrangement;

FIG. 2 is a side view partially in section and taken along a plane running through the axis of a second embodiment of the cone-type clamping arrangement;

FIG. 3 is a side view partially in section and taken along a plane running through the axis of a third embodiment of the cone-type clamping arrangement;

FIG. 6 is a side view partially in section and taken along a plane running through the axis of a sixth embodiment of the cone-type clamping arrangement;

FIG. 7 is a side view partially in section and taken along a plane running through the axis of a seventh embodiment of the cone-type clamping arrangement; and FIG. 8 is a side view partially in section and taken along a plane running through the axis of an eighth embodiment of the cone-type clamping arrangement.

DETAILED DESCRIPTION OF THE PREFERRED EMBODIMENTS

Figure 4:
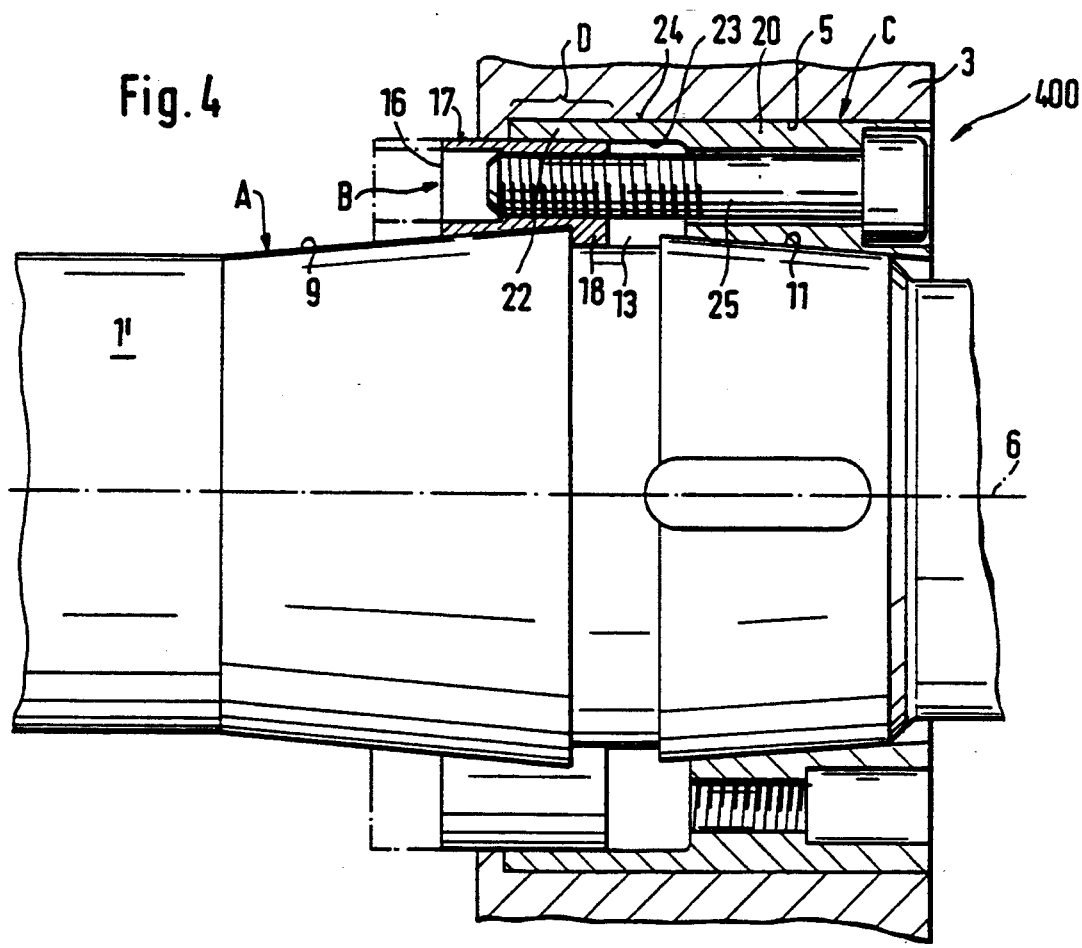
FIG. 4 is a side view partially in section and taken along a plane running through the axis of a fourth embodiment of the cone-type clamping arrangement.

Common to all embodiments is that they comprise a double-cone member A, a cone ring B and a cone member C.

In the exemplary embodiment in FIG. 1, the cone-type clamping arrangement 100 forms a separate clamping assembly which forms a separate structural unit from the members to be clamped, namely the shaft and the hub 3, and is accommodated in a radial intermediate space 2 between the external circumference 4 of the shaft 1 and the internal circumference 5 of the hub 3.

The double-cone member A in this case is a double-cone ring 10 which functions as an internal member and which Is longitudinally slotted in a plane running through the axis 6 to avoid clamping force losses, which is intended to be indicated in the Figure by the lack of hatching in the separation surface 7. The cylindrical internal circumferential surface 8 of the double-cone ring 10 bears on the cylindrical circumferential surface 4 of the shaft 1. It has two axially adjacent conical external circumferential surfaces 9 and 11 with cone angles lying in the self-locking range, the greatest outside diameters of the cone surfaces 9, 11 being adjacent to one another approximately in the center of the double-cone ring 10, seen axially. In this central region, the double-cone ring 10 has an external circumferential groove 13, the flanks 13' of which stand perpendicularly to the axis 6.

Bearing on the cone surface 9 with a conical internal circumferential surface 15 is an external cone ring 16 which forms the cone ring B and has a cylindrical external circumferential surface 17. Projecting inwardly on the internal end, that is to say, the end facing the circumferential groove 13, of the cone surface 15 is a radial circumferential projection 18 which lies in a hook-like manner with its side surface against the flank 13' of the groove 13.

The cone ring 16 is divided in two places staggered in relation to one another in the circumferential direction by 180° and consequently consists of two half rings which, on putting together the clamping assembly, can easily be introduced from outside with the radial circumferential projections 18 into the circumferential groove. As a result, the engagement depth 19 of the circumferential projection 18 can be relatively large so that it can, during loosening of the clamping assembly, transmit correspondingly great axial forces, bearing against the flank 13'.

The cone member C is formed in the exemplary embodiment 100 by an external cone ring 20. The external cone ring 20 bears with its conical internal circumferential surface 21 on the cone surface 11 of the double-cone ring 10. Projecting from the end of the cone ring 20 facing the external cone ring 16 is a thin-walled extension 22 which has a cylindrical internal circumferential surface 23 overlapping the cylindrical external circumferential surface 17 of the external cone ring 16 and forming an "overlap" D, by which the external circumferential surface 17 of the cone ring 16 is kept at a distance from the internal circumference 5 of the hub 3. The cylindrical external circumferential surface 24 of the extension 22 passes over into the cylindrical external circumferential surface of the cone ring 20 and bears against the internal circumference 5 of the hub 3.

The cone rings 16, 20 are pulled towards one another by axial clamping screws 25 which engage in threaded bores 26 of the external cone ring 16. The clamping screw 25 extends through the cone ring 20 in a through-bore 26 and bears with the underside of its head 27 against a friction-reducing and/or force-distributing ring 28 which is supported against, shown in FIG. 1, the left flank 29 of a recess 30 in the cone ring 20, which recess receives the head 27. On the side facing the upper side of the head 27, the recess 30 is delimited by a flank 31 which is likewise perpendicular to the axis 6 and has axial passages 32 on the screw axis, through which a rotary tool can engage in the polygonal recess of the screw head 27. In operation, the recess 32 is closed by a plug 37 or a ring 34 extending over the entire part circle. There can be provided short threaded bores 35 for screwing in a holding element, between the clamping screws 25 in one or more places in the right end side according to FIG. 1 of the cone ring 20. By means of the short threaded bores 35, the clamping assembly can be handled in the depth of the intermediate space 2.

During tightening, the cone rings 16, 20 are pulled towards one another and slide up onto the cone surfaces 9, 11 of the double-cone ring 10 in order to bring about the radial clamping.

For loosening, the screws 25 are unscrewed until after negotiating a small clearance, the outside of their heads 27 bear against the flank 31 of the recess 30. Further unscrewing leads to one of the cone rings 16, 20 being loosened from the double-cone ring 10. Continued unscrewing allows the cone ring 16 with the radial collar 18 at some point in time to come to bear against the flank 13' of the circumferential groove 13, whereupon the other cone ring 20 is also separated from the double-cone ring 10. In practice, the cone angles and the circumferential surfaces are dimensioned in such a manner that the cone ring 16 is loosened first. Otherwise, however, a complete loosening of the cone-type clamping arrangement 100 is always possible. The clamping screw 25 only has to be unscrewed far enough in order to remove the "overlap" D.

The embodiment represented in FIG. 1 has the advantage that the entire part circle, possibly except for one or two threaded bores 35, can be occupied with clamping screws 25 which can almost touch one another with their heads 27 in the circumferential direction. No space needs to be left for separate pressing-off screws, as a result of which the applicable clamping force increases.

The clamping arrangement 200 in FIG. 2 corresponds to that in FIG. 1 with the exception of the pressing-off means. As for the rest, the reference numbers are the same, in so far as there are parts which correspond to one another in this and also in the following examples. The screw heads 27 are not accommodated in a recess corresponding to the recess 30 in Fig. 1 but lie exposed. There are provided, distributed over the circumference between the clamping screws 25, pressing-off screws (not shown) which engage in threads 33 of the cone ring 20 and bear against thread-free places of the cone ring 16.

The cone-type clamping arrangement 300 in FIG. 3 is not a separate clamping assembly with cylindrical external and internal circumferential surface. Although the double-cone member A is, as in embodiments 100 and 200, designed as an internal double-cone ring 10 with cylindrical internal circumferential surface 8 bearing against a shaft, the cone member C is not a ring with cylindrical external circumferential surface but is itself the member to be clamped in the form of a flanged ring 40 on which the cone surface 21 is directly arranged and to which disks or bottoms 36 can be connected. The cone surface 21 interacts with the external cone surface 11 of the double-cone ring 10. In the region of the external cone surface 9 or of the external cone ring 16, the flanged ring 40 has a cylindrical internal circumferential surface 23', which interacts with the external circumferential surface 17 of the cone ring 16 and forms the overlap D.

In the embodiment 400 in FIG. 4, the cone member C is again present as a separate cone ring 20. Although there is no double-cone ring corresponding to the double-cone ring 10 of the preceding figures but the shaft 1', it is itself the double-cone member A functioning as the internal member, in so far as it has itself the cone surfaces 9, 11 and the circumferential groove 13 lying between. The conical internal circumferential surface 21 of the cone ring 20 bears on the cone surface 11 of the shaft 1', and has a thin-walled extension 22 which sits on the outside on the cylindrical external circumferential surface 17 of the cone ring 16 and forms the overlap D and bears with its cylindrical external circumferential surface 24 against the internal circumferential surface 5 of a hub 3.

Figure 5:
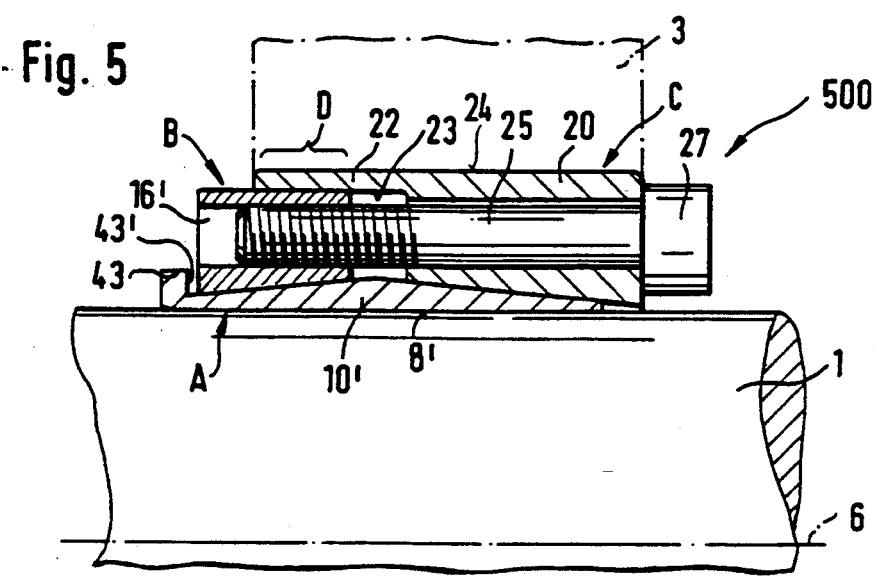
FIG. 5 is a side view partially in section and taken along a plane running through the axis of a seventh embodiment of the cone-type clamping arrangement.

In the cone-type clamping arrangement 500 in FIG. 5, a clamping assembly with cylindrical external and internal circumferential surface 24 and 8', respectively, is again present, which essentially corresponds to the cone-type clamping arrangement 200. A difference exists, however, in the abutment during pressing-off, which in the cone-type clamping arrangement 500 is not formed by a circumferential projection of the cone ring 16' engaging in a circumferential groove of the double-cone member A, but by a radially outwardly projecting circumferential projection 43 of the double-cone ring 10' forming the double-cone member A. The circumferential projection 43 lies outside in front of the end side of the cone ring 16' facing away from the screw head 27 and forms a flank 43' which is perpendicular to the axis 6 and against which, on loosening of the cone-type clamping arrangement 500, the left end side of the cone ring 16' comes to bear. The loosening can take place by means of pressing-off screws, such as are present in the cone-type clamping arrangement 200.

In the cone-type clamping arrangement 600 in FIG. 6, the double-cone member A is again the internal member and designed as a double-cone ring 10' with a cylindrical internal circumferential surface 8' for bearing on a shaft (not shown). As shown in FIG. 6, at the left end of the double-cone ring 10', a radially outwardly projecting circumferential projection 43 with a flank 43' perpendicular to the axis 6 is provided, which extends in front of the radially internal part of the left flank according to FIG. 6 of the cone ring 16' and against which this end side comes to bear upon loosening of the cone-type clamping arrangement 600. The circumferential projection 43 is part of a flange 44, to which driving or driven means can be coupled.

The cone ring 20', arranged outside on the double-cone ring 10' and forming the cone member C, is not intended for insertion into a hub bore, but has the thin-walled extension 22 which forms the overlap D and, in the embodiment shown, fits in the bore 46 of a disk or of a wheel 45. The disk or the wheel 45 could also be integral with the cone ring 20'. The cone ring 20' is unslotted for receiving annular tensile stresses. The cone ring 16' is divided, and the double-cone ring 10 ring slotted, which is intended to be indicated in the Figure by the lack of hatching. However, the separation surfaces in fact lie in places which are staggered in the circumferential direction.

In the cone-type clamping arrangement 700 shown in Fig. 7, there is arranged on the end of a shaft 1" an external member 47 with a fitting bore 48. In the region of the external member 47, there is arranged in the shaft end a bore 49 which is coaxial with the axis 6 of the shaft 1" and in which a clamping assembly is arranged, which during tightening opens out the shaft end radially and in this manner securely clamps the external member 47 thereon.

The double-cone member A of the clamping assembly arranged in the bore 49 consists in this case of a solid double-cone pin 10" with external cone surfaces 9 and 11, on which the cone ring B in the shape of the external cone ring 16' and the cone member C in the shape of the cone ring 20 are arranged. The cone ring 20 has, as in the cone-type clamping arrangements 100, 200 and 500, an axial extension 22 which forms the overlap D and bears on the outside against the cylindrical circumferential surface 17 of the cone ring 16'. To avoid clamping force losses, in this case the cone ring 20 can also be slotted in one place. The radially outwardly projecting circumferential projection 43 which forms the abutment on loosening of the cone-type clamping arrangement 700, is arranged in this case on the left end of the double-cone pin 10", according to FIG. 7, that is to say, the end facing away from the screw heads 27.

In the cone-type clamping arrangement 800 shown in FIG. 8, it is a matter of fixing an external member 3 on the end of a shaft 1'''. In contrast to the preceding embodiments, here the double-cone member A is the external member and is formed by a double-cone ring 10''' which bears with its cylindrical external circumferential surface 8''' against the internal circumference 5 of the external member 3. According to FIG. 8, in front of the left end surface of the cone ring 16', which is now arranged inside the double-cone ring 10''', the radially inwardly projecting circumferential projection 43 is provided. The cylindrical circumferential surface 17 of the cone ring 16' bears against the cylindrical external circumferential surface 51 of a shoulder 50 screwed onto the shaft end. The clamping screws 25 are screwed into the flank 52 of the shoulder 50, which is perpendicular to the axis. The pressing-off screws (not shown) also act against the flank 52. From the outside of the flank 52, the external circumferential surface 53 of the shaft 1''' is of conical design in the contact region of the double-cone ring 10'''. Therefore, in this case, the shaft 1''' is the cone member C. The overlap D is formed in the axially external region of the circumferential surface 51.

Common to all embodiments is the fact that, during tightening of the axial clamping screws 25, a displacement taking place with friction only occurs on three surfaces. At the same time, the hub 3 is, of course, displaced slightly in the axial direction in relation to the shaft 1, 1' or 1''', which in many cases, however, plays no significant role. In FIG. 7, no axial displacement of the external member 47 occurs in relation to the shaft 1", of course, because here the functioning parts of the cone-type clamping arrangement 700 are located in the bore 49 and have no contact with the external member 47.

The expression "thin-walled" for the double-cone ring 10 and the axial extension 22 is intended to mean that the wall thickness of these parts in the radial direction amounts to only a fraction of the diameter of the axial clamping screws 25, which is approximately a quarter to a half in the embodiments. The cone rings 16 and 20 are in contrast to be considered "thick-walled", because they can receive the clamping screws 25 in through-bores or threaded bores.

The action of the overlap D consists not only in supporting the circumferential surface 17 of the cone ring 16 or 16' but also in guaranteeing the holding together of the parts. The cone ring 16, 16' is, after all, intended to be divided into two half rings in order to be capable of mounting it with a sufficient engagement depth 19 (FIG. 1) without excessive mechanical deformation. The two half rings are securely held radially and pressed onto the cone surface by the overlap D so that, after making the overlap D, they can no longer be removed from the double-cone ring 10, 10', 10", 10'''.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications

What is claimed is:

1. A cone-type clamping arrangement for clamping a hub to a shaft comprising:
   a double-cone member (A) having first and second axially adjacent circumferential surfaces (9, 11) designed as self-locking cone surfaces which are arranged such that the greatest wall thickness of the double-cone member (A), seen axially, is situated approximately in its center, and a flank which projects radially in the region of a plane which is perpendicular to an axis of the arrangement;
   a first cone ring (B) having a cylindrical circumferential surface (17) and an opposing conical circumferential surface (15) which has a cone angle which is the same as a cone angle of the first cone surface (9)

of the double-cone member (A) and which bears against the first cone surface;

a cone member (C) having a conical circumferential surface (21) which has a cone angle which is the same as a cone angle of the second cone surface (11) of the double-cone member (A) and which bears against the second cone surface, and an overlap (D) with a first cylindrical circumferential surface (23) which overlaps the cylindrical circumferential surface (17) of the first cone ring (B) and bears against the cylindrical circumferential surface of the cone ring;

axial clamping cap screws (25) which are distributed over the circumference of the arrangement and which extend through one of the first cone ring (B) and the cone member (C) and bear against the one of the first cone ring (B) and the cone member (C) with a head (27) and engage with a thread in the other of the one of the first cone ring (B) and the cone member (C), and pressing-off means for axially removing the first cone ring (B) and the cone member (C) from one another, the pressing-off means cooperating with the flank to oppose the first cone ring (B) from being pushed off from the first cone surface (9) of the double-cone member (A);

wherein the overlap (D) on the cone member (C) is a thin-walled extension (22) which extends in the direction of the axis of the arrangement, the thin-walled extension having a second cylindrical circumferential surface which is coaxial with the first cylindrical circumferential surface (23), which is contiguous with a cylindrical circumferential surface (24) of a second cone ring (20) forming the cone member (C), and which bears against the hub (3).

2. A cone-type clamping arrangement according to claim 1, wherein the flank (13', 43') is formed in one piece on the double-cone member (A) and the first cone ring (B) is, in at least two places which are uniformly distributed over the circumference, continuously divided in planes running through the axis (6).

3. A cone-type clamping arrangement according to claim 1, wherein at least one of the double-cone member (A) and the cone member (C) are designed as double-cone ring (10, 10', 10''') or cone ring (20) with cylindrical circumferential surface (8, 8'; 24) lying opposite the cone surfaces.

4. A cone-type clamping arrangement according to claim 1, wherein the double-cone (A) is an internal member with external circumferential surfaces designed as the first and second cone surfaces (9, 11), and the first cone ring (B) and the cone member (C) are each arranged on a corresponding one of the first and second cone surfaces, the respective conical circumferential surfaces (15, 21) of the cone ring and the member being internal surfaces.

5. A cone-type clamping arrangement according to claim 1, wherein the flank (13') projecting radially in the region of a plane perpendicular to the axis (6) is formed by a flank of a circumferential groove (13) provided axially between the cone surfaces (9, 11) of the double-cone member (A), and the first cone ring (B) has at its thin-walled end a circumferential projection (18) which projects perpendicularly to the axis (6) and engages in the circumferential groove (13).

6. A cone-type clamping arrangement according to claim 1, wherein the flank (43') projecting radially in the region of a plane perpendicular to the axis (6) is formed by a circumferential projection (43) of the double-cone member (A), the circumferential projection is provided at an external end of the first cone surface (9) of the double-cone member (A) and projects radially in front of the axially external end side of the cone ring (B) in the region of the plane perpendicular to the axis (6).

7. A cone-type clamping arrangement according to claim 1, wherein the pressing-off means are formed by axial pressing-off screws which are distributed uniformly between the clamping screws (25) in a circumferential direction and which engage in threaded bores (33) of a selected one of the first cone ring (B) and the cone member (C) and which are supported against bore-free places on an axially internal end side of the other of the selected one of the first cone ring and the cone member.

8. Cone-type clamping arrangement according to claim 1, wherein the cone member (C) has recesses (30) for receiving the head (27) of the clamping screws (25), which, at a spacing which slightly exceeds a height of the head (27), have flanks (29, 31) perpendicular to the axis as contact surfaces for the underside or upper side of the head (27) and in that the cone member (C) has axial through-bores (26) for the introduction of the clamping screws (25).

9. A cone-type clamping arrangement according to claim 1, means, on actuation of the pressing-off means for ensuring that the first cone ring (B) is loosened first and comes to bear against the flank (13', 43') of the double-cone member (A).

10. A cone-type clamping arrangement comprising:
a hub;
a shaft;
a double-cone member (A) having first and second axially adjacent circumferential surfaces (9, 11) designed as self-locking cone surfaces which are arranged such that the greatest wall thickness of the double-cone member (A), seen axially, is situated approximately in its center, and a flank which projects radially in the region of a plane which is perpendicular to an axis of the arrangement;

a first cone ring (B) having a cylindrical circumferential surface (17) and an opposing conical circumferential surface (15) which has a cone angle which is the same as a cone angle of the first cone surface (9) of the double-cone member (A) and which bears against the first cone surface;

a cone member (C) having a conical circumferential surface (21) which has a cone angle which is the same as a cone angle of the second cone surface (11) of the double-cone member (A) and which bears against the second cone surface, and an overlap (D) with a first cylindrical circumferential surface (23) which overlaps the cylindrical circumferential surface (17) of the first cone ring (B) and bears against the cylindrical circumferential surface of the cone ring;

axial clamping cap screws (25) which are distributed over the circumference of the arrangement and which extend through one of the first cone ring (B) and the cone member (C) and bear against the one of the first cone ring (B) and the cone member (C) with a head (27) and engage with a thread in the other of the one of the first cone ring (B) and the cone member (C), and pressing-off means for axially removing the first cone ring (B) and the cone member (C) from one another, the pressing-off means cooperating with the flank to oppose the first cone ring (B) from being pushed off from the first cone surface (9) of the double-cone member (A);

wherein the overlap (D) on the cone member (C) is a thin-walled extension (22) which extends in the direction of the axis of the arrangement, the thin-walled extension having second cylindrical circumferential surface which is coaxial with the first cylindrical circumferential surface (23), which is contiguous with a cylindrical circumferential surface (24) of a second cone ring 20 forming the cone member (C), and which bears against the hub (3);

wherein the double-cone member, the first cone ring, the axial clamping cap screws and the pressing-off means are disposed in a space defined between the hub and the shaft, and the thin-walled extension prevents the cylindrical circumferential surface of the first cone ring from contacting an inner circumferential surface of the hub so that during tightening of the arrangement no friction forces are experienced on the cylindrical circumferential surface of the first cone ring due to the hub.

* * * * *